United States Patent [19]
Caffine

[11] 3,961,142
[45] June 1, 1976

[54] METHOD AND APPARATUS FOR AUTOMATICALLY ANNUNCIATING THE COMPLETION OF A TELEPHONE CALL HOLD INTERVAL

[76] Inventor: George S. Caffine, 11212 Valley View Ave., Kensington, Md. 20795

[22] Filed: Oct. 24, 1974

[21] Appl. No.: 517,627

[52] U.S. Cl. .............................. 179/81 R; 179/99
[51] Int. Cl.² .................... H04M 1/00; H04M 3/22
[58] Field of Search ............. 179/84 R, 84 L, 81 R, 179/81 C, 99, 18 F, 18 FA, 1 MN

[56] References Cited
UNITED STATES PATENTS

| 2,506,279 | 5/1950 | Rowe | 179/84 L |
|---|---|---|---|
| 3,742,151 | 6/1973 | Ruether | 179/99 |
| 3,806,665 | 4/1974 | Goldberg | 179/84 L |

FOREIGN PATENTS OR APPLICATIONS

| 610,249 | 10/1948 | United Kingdom | 179/81 C |

Primary Examiner—Kathleen H. Claffy
Assistant Examiner—Joseph Popek
Attorney, Agent, or Firm—Holman & Stern

[57] ABSTRACT

A method and apparatus is disclosed which serves to automatically indicate to one (local) party to a telephone call on a telecommunication line placed in a hold condition that the other (distant) party to such call has returned to the line thus completing a call hold interval and relieving the local party of the burden of waiting while continuously aurally monitoring the call throughout the call hold interval. The invention contemplates the automatic and electronic monitoring of the telephone line during the hold condition thereof to detect the presence of a voice signal thereon, such voice signal indicating the return of the distant party to the line. Upon detection of the voice signal, an annunciation signal is generated and provided the local party to the call to therefore signal the completion of a telephone call hold interval. In one of the preferred embodiments, this operation is achieved through the utilization of a modified key equipment "line card" for a conventional telephone communication system, such "line card" being provided in addition to the standard circuits with a voice detection circuit which is actuatable during a hold condition of the telephone line to effect a ringing of the bell and/or a flashing of the key switch lamp on its associated telephone upon the detection of voice signals. In this fashion, the party that was "placed on hold" can similarly place his telephone "on hold" through the manipulation of the hold key switch or button and be recalled to the telephone when the other party returns and speaks over the telephone line.

13 Claims, 5 Drawing Figures

METHOD AND APPARATUS FOR AUTOMATICALLY ANNUNCIATING THE COMPLETION OF A TELEPHONE CALL HOLD INTERVAL

BACKGROUND OF THE INVENTION

This invention generally relates to telecommunication systems and particularly is concerned with the provision of an improvement to existing call holding arrangements for telephone line circuits.

Telephone communication systems have markedly increased in complexity and sophistication over the years, such systems providing a wide variety of customer services. Among the most common equipment in use today is so-called multi-line key equipment which includes telephones having a plurality of push-buttons or keys enabling the selection and manipulation of a plurality of different phone lines and further enabling any particular call to be placed in so-called "hold."

This "holding" capability of the modern multi-line telephone, while providing a considerable convenience to its user enabling the user to switch to other telephone lines and the like without disconnecting the call which is on hold, is not without its inherent disadvantages. Specifically, it frequently occurs that the hold period, at least for the party on the telephone line who has been placed "on hold" and is waiting, extends for an uncomfortably long duration. In an effort to alleviate this inconvenience to the party who was placed "on hold," many systems and devices have been proposed, some of which contemplate the automatic generation of soothing music on the telephone line during the hold condition so as to entertain the holding party. Other systems serve to automatically measure the time duration of any particular hold interval and serve to generate a reminder signal to the party who initially placed the call on hold. In fact, the key switch lamp on existing multi-line telephones which have placed a call in a "hold condition" is automatically "winked" by the key equipment "line card" currently provided in association with the multi-line telephone by the telephone company, to serve as a reminder of the "hold condition" of an existing call.

Notwithstanding these prior-art and existing attempts to alleviate the inherent annoyance to the party who has been placed "on hold" during an unusually long "hold interval," it remains that the party who was placed on hold, i.e. the passive party, must wait and aurally monitor the telephone line for the return of the party who initially initiated the hold condition, i.e. the active party. Thus, the business of the passive party will be interrupted for virtually the entire length of the telephone hold interval, and the time of the passive party will be thus wasted.

SUMMARY OF THE INVENTION

It is therefore apparent that a need exists in this art for the modification of current and existing telephone call holding equipment such that the party placed "on hold" will have the same freedom to leave his telephone and perform other duties, for example, as is the case with the party who initiated the hold condition. It is the primary objective of the instant invention to provide such an apparatus and method which serves to relieve the passive party from the burden of having to aurally monitor the telephone line throughout a telephone hold interval, by serving to automatically notify such passive party that the active party has returned to the line thus completing the hold interval.

A further objective of the instant invention is the provision of a method and apparatus which will annunciate to the passive party the completion of a telephone hold interval by means of a signal generated at or near the telephone of such passive party.

Yet another objective of the instant invention is the provision of an annunciator system of the type described which has particular utility with multi-line key equipment and which particularly can be incorporated into the so-called key equipment "line card" thus expanding the capabilities cards"such "line cards" at a minimum of additional cost, the annunciator system generating a signal or signals similar to that which would indicate that a new telephone call was in progress.

These objectives, as well as others which will become apparent as the description proceeds, are implemented by the instant inventive method and apparatus which, as aforestated, automatically indicates to one party to a telephone call placed in a hold condition, i.e. the passive party, that the other party to the call, i.e. the active party, has returned to his telephone thus completing a call hold interval on a telephone communication line, and relieving the passive party of the unnecessary burden of aurally monitoring the call on his own telephone throughout the call hold interval.

To achieve this function, the instant invention contemplates the utilization of an electronic circuit means which, in effect, operates as a substitute for the aural monitoring now required by the passive party. In this respect, the instant invention contemplates the provision of a circuit means which seeks to detect a signal on the telephone line which would indicate the end of a hold interval, i.e. which signal would indicate that the active party has returned to the telephone line. It should be appreciated that when such active party has placed a call in a "hold condition" and returns to the telephone line, such party must provide some indication of the return such as by a voice utterance. This voice utterance or signal must of necessity be present for a telephone call to progress in normal and logical fashion and the electronic circuitry of the instant invention is contemplated to detect this inherently present signal which occurs at the end of a telephone hold condition and which, as mentioned above, automatically serves to indicate the completion of a telephone hold interval. This detected voice signal is utilized to generate an annunciation signal at the location of the passive party thus signalling the passive party that the active party has returned. With this technique, the passive party as well as the active party can place their respective telephones on "hold" and proceed to other activities, with the return of the active party to the telephone line being automatically signalled at the telephone of the passive party through the detection of the re-occurrence of a voice signal on the telephone line during the hold condition thereof.

BRIEF DESCRIPTION OF THE DRAWINGS

The invention will become better understood and further features and advantages thereof will become apparent from the following detailed description of the preferred inventive embodiment, such description making reference to the appended sheets of drawings, wherein.

DETAILED DESCRIPTION OF THE PREFERRED INVENTIVE EMBODIMENTS

Figure 1:
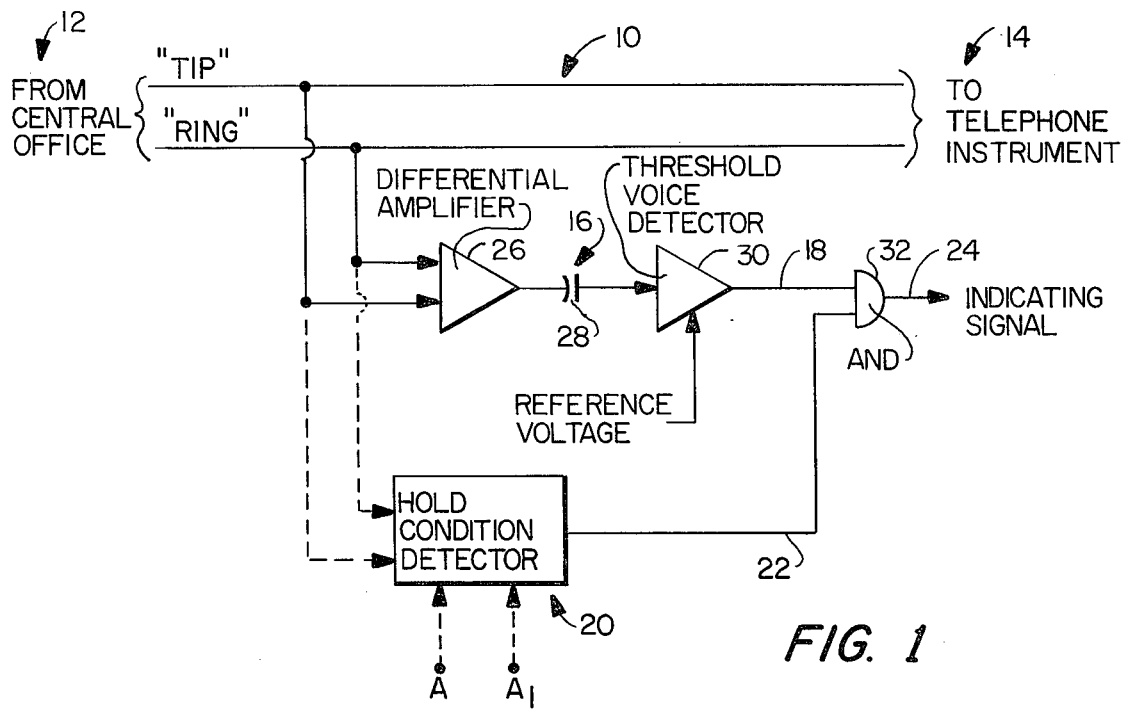
FIG. 1 is an electronic schematic illustration of the basic annunciator circuitry of the instant invention.

The implementation of the circuitry of the instant invention in its basic form thereof will first be discussed with reference to FIG. 1 of the appended application drawings. In such drawings, a telephone communication line has generally been designated by reference numeral 10, such communication line being part of an overall telephone communication system which includes a central office or other distant telephone equipment designated by numeral 12 for example, and providing the typical and conventional call monitoring and control functions, and an individual telephone instrument provided at a location generally designated by reference numeral 14. In this basic embodiment of the invention, the telephone equipment utilized need not be the sophiscated multi-line key equipment providing the automatic "hold condition" and the like, but can comprise conventional single-line equipment as is commonly found in residences for example. In this respect, a "hold condition" will be defined as a situation wherein one party to a telephone call temporarily ceases voice communication while still maintaining the telephone call.

As explained at the outset, the primary objective of the instant invention is to signal to a passive party the return of the active party to a telephone call which has been placed in a hold condition thus signalling the completion of a telephone call holding interval. In this respect, one signal which can be monitored on the telephone line indicating the completion of a telephone call holding interval is the re-occurrence of a voice signal on the telephone line while the line is in a hold condition.

To this end, the invention contemplates the provision of a first detection circuit generally designated by reference numeral 16 which would serve to monitor the presence of a voice signal on the telephone communication line 10 and provide an output along conductor 18, for example, when such voice signal is present. Additionally, a hold condition detector generally designated by reference numeral 20 is provided to detect a "hold condition" of the telephone line 10 and, upon such detection, provide an output along conductor 22, for example. In accordance with the basic premise of the instant invention, an indicating signal designated at output 24 will be generated upon the concurrence of an output from the voice detection circuitry 16 and an output from the line hold condition detector 20, thus signalling the return of the "active party" and the completion of a telephone call hold interval.

To detect the presence of a voice signal on telephone line 10, many different and conventional circuits can be provided. In one of the preferred inventive embodiments, such voice detection is contemplated to be achieved through the provision of a differential amplifier 26 having two inputs disposed across the so-called "tip" and "ring" terminals or wires of the telephone line 10, differential amplifier 26 taking the voltage difference between the "tip" and "ring" terminals of the telephone line to produce a proportional voltage output representative of a voice or audio signal for example. By utilizing both the "tip" and "ring" terminals or wires of the telephone line, advantages in performance can be obtained, in that such lines have so-called balanced or matched characteristics whereby a signal consisting of the difference in voltage between these two wires would be relatively noise-free. Such a differential input thereby facilitates the error-less detection of the sought-after voice signal. Further, the differential amplifier 26 is contemplated to be constructed in conventional fashion to peak at a voltage input which would be slightly above that to be expected for a relatively quiet normal voice peak.

The output from differential amplifier 26 is preferably contemplated to be passed through a filter means, such as blocking capacitor 28. Capacitor 28 serves to remove the D.C. bias of the differential amplifier 26 and conduct the alternating current signal within the normal voice frequency band of the telephone line 10 with minimal attenuation. Such D.C. blocking could also be achieved by the placement of a blocking capacitor prior to the inputs of differential amplifier 26, or, alternatively, the blocking capacitor 28 could be eliminated entirely if the telephone communication system is such that very low frequency noise signals do not exist.

The output from differential amplifier 26, or from blocking capacitor 28 as the case may be, is then contemplated to be passed to a threshold detector 30 of conventional construction, threshold detector 30 serving to detect an actual voice signal from the alternating current signal passed by differential amplifier 26. The threshold detector is constructed in typical fashion such that the detector 30 will not be actuated by the loudest background noise over the telephone communication line 10, and will be actuated by the lowest pitched human voice, providing, however, that the input signal thereto exceeds a predetermined minimum as set by the indicated reference voltage, which reference voltage can be experimentally determined depending upon the specific characteristics of the individual telephone communication line. On conventional telephone lines, the level has been found to be approximately −30dBm.

The hold condition detector 20 serves, as explained above, to detect a hold condition of the telephone line 10, which "hold condition" can be evidenced by a hold signal either from the local telephone as indicated at 14, or over the telephone line 10, initiated by the calling or "active" party, for example. Such a signal representing the presence of a "hold condition" on the telephone line 10 can take a number of well-known forms. For example, a "hold condition" can be evidenced by the detection of an elapsed period of time wherein there is no voice signal on the line 10. The threshold detector 30, in this instance, would therefore be combined with a timing circuit to provide an output which would indicate such a "hold condition." In this respect, attention is directed to the disclosure in U.S. Pat. No. 3,806,665, which disclosure is incorporated by reference herein.

A further "signal" that could be detected by hold condition detector 20 to evidence a "hold condition" on telephone line 10 could be a switch input that was directly connected to such hold condition detector and actuated when a "hold condition" was placed on the line. As a further alternative, such hold signal could be the existing signal that is present in association with the operation of the push-buttons of multi-line key telephones.

For example, and with respect to such multi-line telephones, the hold detector 20 could utilize the "ring" and "tip" wires of the telephone communication line 10 in conjunction with the so-called A and A-1 input lines associated with the push-button or key or a multi-line telephone to analyze the voltage or current of these wires to determine whether or not a hold condition exists, in conventional manner. Again, reference is made to the disclosure in U.S. Pat. No. 3,806,665 for one form of a hold signal detector.

The concurrence of a voice signal on the telephone line 10 while such line is in a "hold condition" serves to signal the completion of a telephone hold interval and such concurrence is determined through the provision of conventional combining logic, which in its simplist form could comprise an "AND" gate such as is designated by reference numeral 32, for example. As explained, the output from the combining logic 32 constitutes the indicating signal 24 which is utilized in accordance with the teachings of the instant invention to notify the "passive" party to the call that the "active" party has returned, thus completing the telephone call hold interval.

In its basic form, the indicating signal 24 is utilized to provide an audible and/or visible signal to the "passive" party at or near the telephone 14, for example, thus notifying the "passive" party to return to the telephone to continue the conversation with the "active" party who has completed the hold interval. In a more sophisticated form, and as will be described hereinbelow, such indicating signal could be effected by ringing the telephone bell, and/or by flashing a key switch lamp such as would exist on a multi-line telephone.

In any event, and even with the basic embodiment of FIG. 1, the "passive" party to the telephone call would be relieved of the burden of continuously monitoring the call after such call has been placed in a "hold condition," the "passive" party being automatically signalled whenever the "active" party returns so as to complete the call hold interval. With one of the basic embodiments which is shown in FIG. 1, such "passive" party could simply leave his telephone "off-hook" and go about other business. With the more sophisticated multi-line equipment, the "passive" party could himself place his own telephone on "hold" through a manipulation of the proper key switch or button, thus ensuring improved performance of the inventive system by eliminating the possibility of spurious voice signals.

The implementation of the novel function of the instant invention can perhaps best be achieved through the modification of conventional key equipment. Key telephones, that is, telephones having a plurality of lines appearing on them in the form of and accessible through lighted push-buttons or keys, commonly function through the use of circuitry external to the telephones. This external circuitry is located in the neighborhood of the telephone instruments and provides key telephone features such as line pickup and holding, intercommunication, visual and audible signals, cutoff, exclusion and signalling.

The circuitry associated with an individual telephone line and which provides line pickup and holding as well as visual and audible signals for that line can be grouped together to form a distinct physical entity. In one of the more common embodiments of key telephone equipment, commonly known as the "1A2 Key System," this group of circuitry associated with an individual telephone line, is contained on a single plug-in printed circuit board and is commonly referred to as a "1A2 Key System Line Card" or simply a "line card" (when it is understood to be in a 1A2 Key System context). These "line cards" are produced by various manufacturers so that they are completely interchangeable although they may differ in internal details.

It is therefore an extreme benefit to be able to produce the circuitry required for a single key telephone line in the form of a "line card" and, furthermore, to incorporate this instant invention into a circuit which can be plugged in place of a standard "line card" and have the replacement circuit provide all of the functions normally provided by the "line card" in addition to the functions outlined by the teachings of the instant invention.

Figure 2:
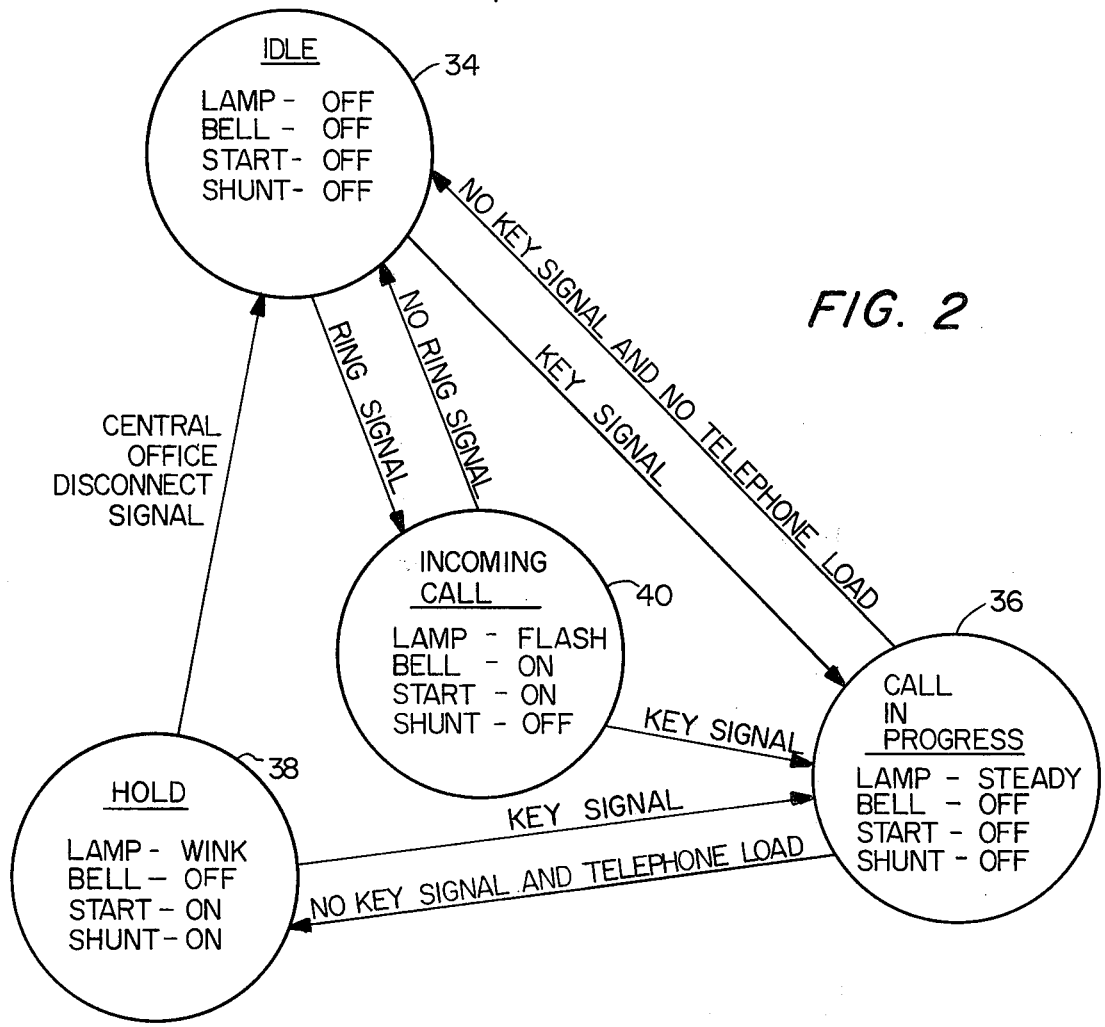
FIG. 2 is a state diagram illustrating the normal required functions of key equipment "line cards" as in present use in conjunction with multi-line telephone sets.

Attention is directed to FIG. 2 of the application drawings in which a state diagram is depicted illustrating the usual operation of such "line cards." As indicated, when the telephone is initially "idle," there is no call in progress, no incoming call, the key switch lamp would be off, the telephone bell would be silent, the power supply interrupter would not provide a start signal, and no hold condition would be maintained, this "idle" condition being illustrated by element 34 of the state diagram.

If the local telephone was then picked up and an appropriate push-button was depressed, the key signal would be generated and the "line card" would advance to a so-called "call-in-progress" state, illustrated by element 36. In this state, the interrupter would be off, and the "line card" would not maintain the hold condition. The key switch lamp would be continuously energized.

If the party would subsequently place a call on "hold" by depressing or actuating the push-button on the telephone associated with the "hold" function, the key signal will be briefly removed for the time that the push-button was held down before the telephone load would be removed from the telephone line when the push-button was released, causing the "line card" to advance to the so-called "hold" state illustrated by element 38 wherein the key switch lamp would "wink," , wherein the bell would be off, wherein the interrupter would be on (so as to produce the lamp winking as well as flashing, and the interrupted ringing signals required in other states), and wherein the "line card" would maintain a so-called "hold" condition" by disposition of a D.C. shunt across the "tip" and "ring" terminals of the telephone line.

If the remote or distant party to the call then would hang up his telephone before the local party re-enters the call, the Central Office Disconnect Signal constituting a loss of potential would therefore be received before the key signal, and the "line card" would be returned to the "idle" state illustrated by element 34, rather than to the "call-in-progress" state illustrated by element 36.

The "line card" also controls functions associated with the handling of an incoming call, as illustrated by element 40 in the state diagram. In such "incoming call" state, and in well-known fashion, the "line card" would cause the key switch lamp to flash, and would further cause the bell to ring, the shunt would be off, and the start command would be given as is illustrated.

Figure 3:
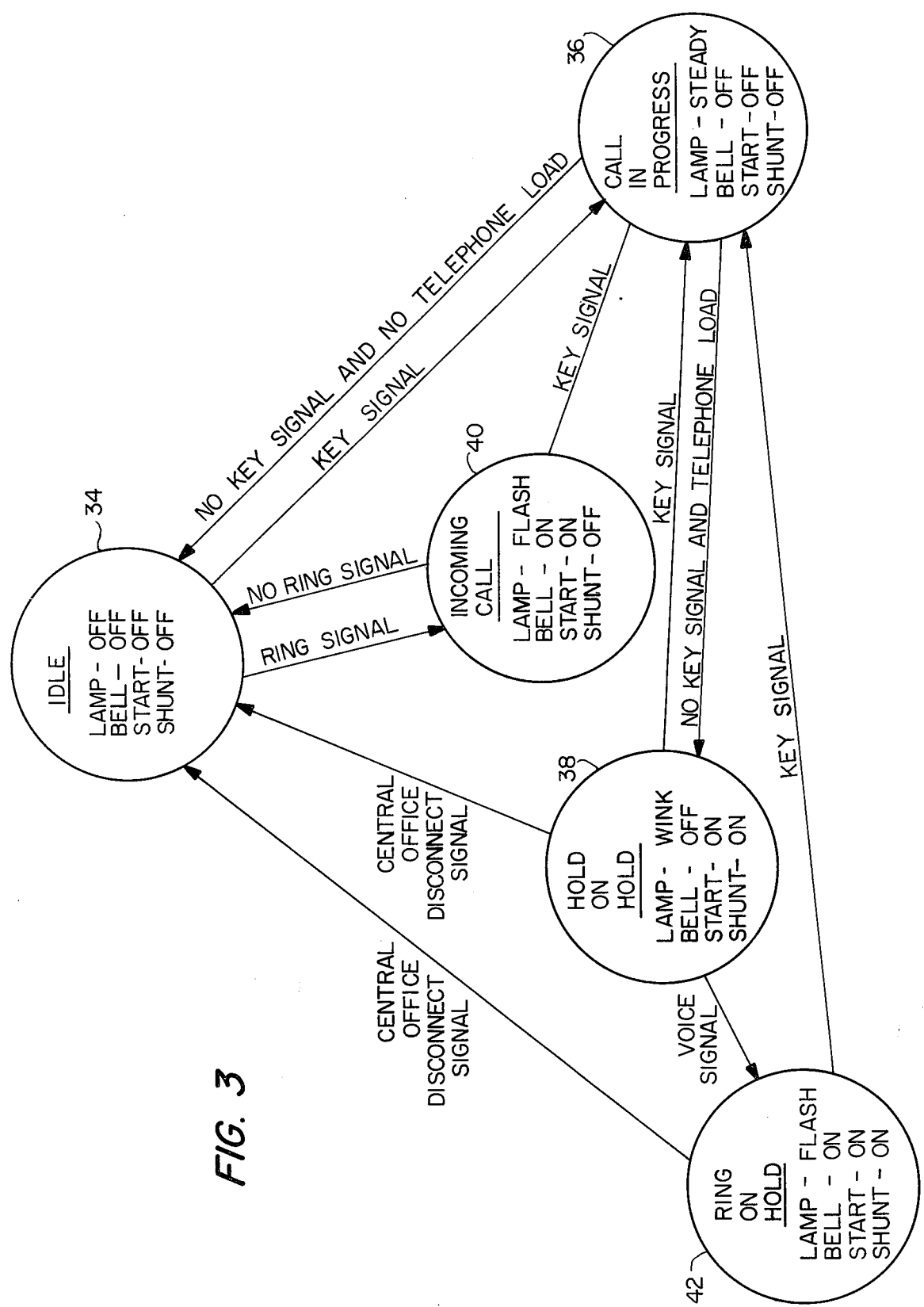
FIG. 3 is a state diagram of such "line cards" when modified to perform the additional annunciator functions of the instant invention.

Reference is now made to FIG. 3 of the application drawings wherein the state diagram thereof depicts not only the generally conventional operation of a "line card" as was discussed with respect to FIG. 2, but also depicts the additional functions attributed to such "line card" by its modification to incorporate the instant invention. As was above discussed, one of the most convenient and direct applications of the novel inventive technique is in association with a "line card" for multi-line key equipment. With respect to FIG. 3, the conventional "line card" operations indicated by states 34, 36, 38, and 40 are retained in the manner previously discussed with respect to FIG. 2. In addition, the functional operation of the modified "line card" incorporates an additional or second hold state depicted by element 42, the function of which will be explained hereinbelow.

To just briefly reiterate, it will be recalled that the novel circuitry of the instant invention is primarily designed to detect the presence of a voice signal on the telephone line during a "hold condition" of such telephone line and, upon such detection, to signal the party to the call that a hold interval has been completed. As applied to the modified "line card" as illustrated herein, the "hold condition" of the telephone would be a hold state initiated through depressing of a key switch or button on the multi-line telephone as referred to hereinabove. When the "line card" is placed in such a hold state, the detection of a voice signal on the telephone line would serve to switch the modified "line card" from the conventional hold state indicated by element 38, into the modified "ring on hold" state illustrated by element 42, wherein an annunciation signal would be generated at the telephone. Such annunciation signal, in the preferred inventive embodiment, would constitute a flashing of the key switch lamp as would occur in the event that an incoming call were taking place, as opposed to the conventional "winking" of the key switch lamp. In addition, the bell on the telephone would be activated, again as would occur if an incoming call were taking place. In effect, then, the detection of a voice signal on the telephone line after the passive party has placed his "line card" into a "hold condition" would cause the telephone of the "passive" party to effectively simulate an incoming call by flashing a line key switch lamp and by ringing the telephone bell. As is also indicated by the state diagram of FIG. 3, the transitions out of this additional hold state illustrated by element 42 are identical to the transitions out of the conventional hold state indicated by element 38.

Figure 4:
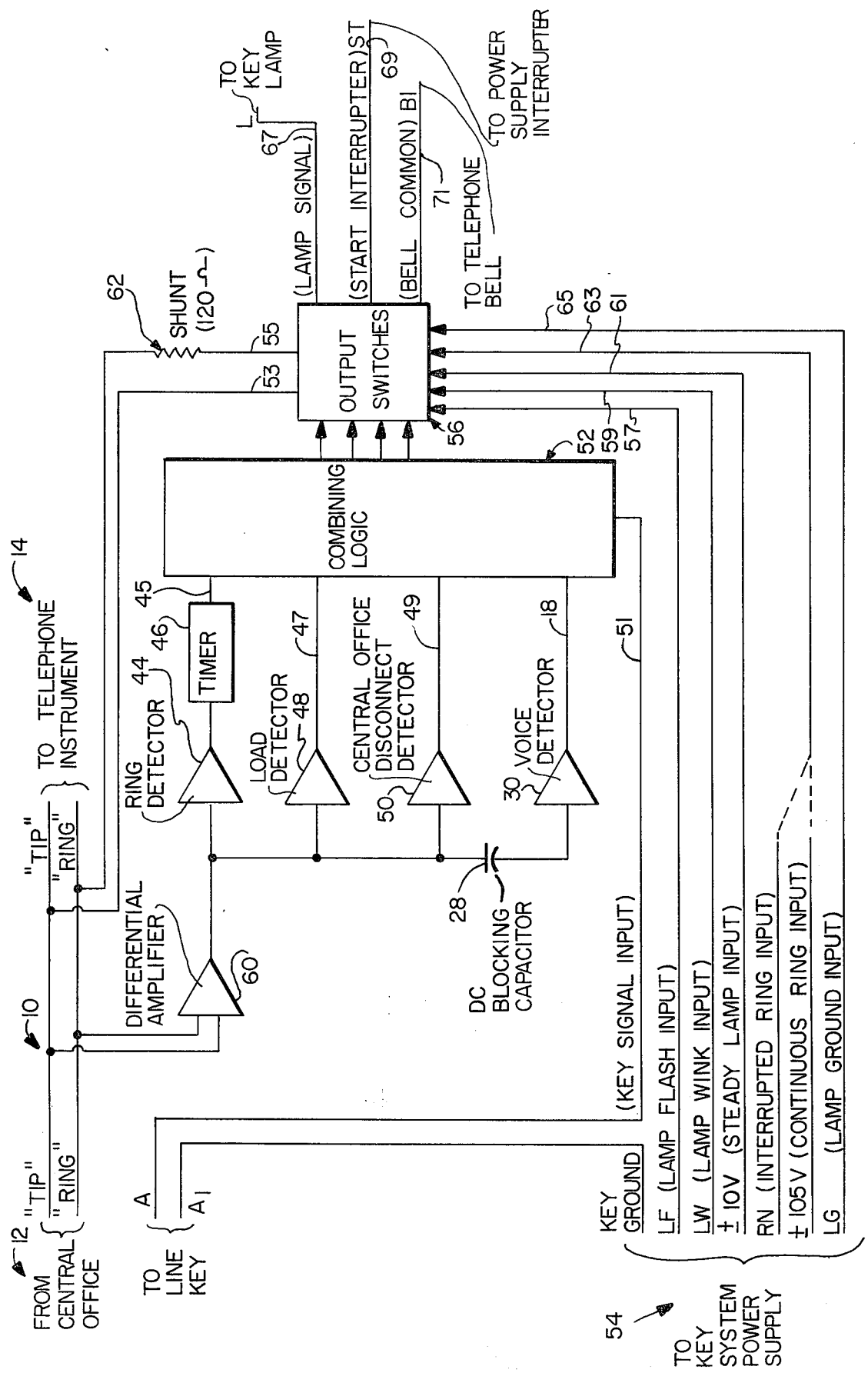
FIG. 4 is a schematic block diagram of a "line card" modified in accordance with the teachings of the instant invention to provide the additional annunciator function as above discussed.

To achieve the functional operation of a "line card" in accordance with the state diagram of FIG. 3, relatively minor modifications are required to existing techniques and equipment and, in this report, attention is now directed to FIG. 4 of the application drawings depicting in schematic format a so-called "line card" modified so as to perform the additional function of the instant invention.

With respect to FIG. 4 of the application drawings, the more conventional elements of a "line card" will first be discussed so as to provide suitable background to enhance an understanding of this inventive circuit modification. Again, and as was the case with the basic embodiment of the invention depicted in FIG. 1, a telecommunication line 10 having both "tip" and "ring" wires or terminals is illustrated as running between a central office 12 and a telephone 14, telephone 14 in this instance comprising a conventional multi-line instrument. The voltage across the "tip" and "ring" wires is sensed by a differential amplifier 60, the differential amplifier providing an output proportional to the difference in voltage between the two inputs. This output is passed to a variety of detection circuits and that distinguishes this differential amplifier 60 from amplifier 26 shown in FIG. 3 in that signals in addition to voice signals (including D.C.) must be represented on the output.

Specifically, one such detection circuit is a ring detector illustrated by reference numeral 44 which serves to detect the presence of a ring voltage on the telephone line 10, such ring voltage typically constituting a 20Hz, 105VAC signal having a two second on and four second off duty cycle. Of course, and as is well-known, such signal may vary widely and still be detectable by suitable ring detectors 44. The detected ring signal then is passed to a timing apparatus 46, timing apparatus 46 measuring the silent interval between the Central Office ringing intervals to maintain the lamp and bell signal on the telephone during such intervals. In this respect, "line cards" are normally provided with a six second timing device for this purpose, with a 30 second timing device also being available as an option for different ringing modes.

The output from the differential amplifier 60 further is passed to a load detector 48, the load detector determining that the voltage across the telephone line is less than a predetermined amount which would indicate that a heavy current is flowing, and that a telephone load is placed across the line. Typically, the voltage detected is between 3 and 12 volts when a load is present, and the Central Office potential is provided.

The differential amplifier output 60 is further coupled to a Central Office Disconnect Detector 50, this element determining that the voltage across the line 10 is greater than a predetermined amount to thus indicate that an "end of call" signal has not been received from the Central Office as would ultimately be caused when the distant or remote party hung up his telephone and the resultant subsequent removal of the Central Office potential is caused.

These signals from detector 44 and associated timer 46, from detector 48, and from detector 50, are then passed to a combining logic circuit means illustrated by reference numeral 52, the combining logic circuit means taking the ringing signal, the load signal, and Central Office Disconnect signal, and a variety of conventional key signal inputs generally designated by reference numeral 54 to operate output switches illustrated by reference numeral 56 in accordance with the sequences and switch commands as was illustrated in the state diagram of FIGS. 2 and 3 with respect to states 34, 36, 38, and 40. Details of the construction of these various elements are provided in the explanation of FIG. 5.

So as to cause this exemplary "line card" to perform the additional function of the instant invention as was discussed with respect to the state diagram of FIG. 3, and specifically element 42 thereof, an additional voice detection circuit 30 would be provided coupled to the output of differential amplifier 60 through a filter means such as the D.C. blocking capacitor 28. Accordingly, and at the output of detector circuit 30, a signal will be provided whenever a voice is detected over the telephone line 10.

When the telephone 14 of the embodiment depicted in FIG. 4 is placed into a "hold" state, a shunt resistor such as a 120 ohm resistor illustrated by reference numeral 62 would be placed across the "tip" and "ring" wires of the telephone line so as to maintain the "hold condition" when the "line card" is in a hold state. When an output is present from the voice detector 30 concurrently with the indication of a "hold" state as would be determined within the combining logic circuit means 52, the output switches 56 would be actuated to provide the function illustrated by element 42 in the state diagram of FIG. 3, and specifically, so as to cause the key switch lamp to flash, so as to cause the telephone bell to ring, and so as to maintain the start signal in an ON condition as well as to maintain the resistive shunt signal in an ON condition, as is shown. Thus, the output switches as illustrated by element 56 which serve to connect the power supply inputs to the lamp signal, which serve to connect the power supply interrupter start signal, and a bell signal in accordance with the information depicted for each state in FIG. 3 of the application drawings, are also advantageously utilized to provide the additional functional state depicted by element 42 in FIG. 3 of the application drawings.

With this preferred approach, it should be noted that the annunciation signal will be generated regardless of which party to the call initially instituted the "hold condition." Further and as yet another possible example of the operational features of the instant invention, a situation might arise wherein the so-called distant party to a telephone call placed "on hold" by the so-called local party desired to terminate an unusually long "hold condition," and expressed such desire by talking on the line. Such voice signal would be sensed by the described equipment provided at the location of the local party and would serve to generate the annunciation signal thereat thus indicating to the local party that the "hold condition" had extended for an undue duration. Accordingly, the phrase "completion of the call hold interval" as utilized herein is to be construed to encompass this situation as well.

Figure 5:
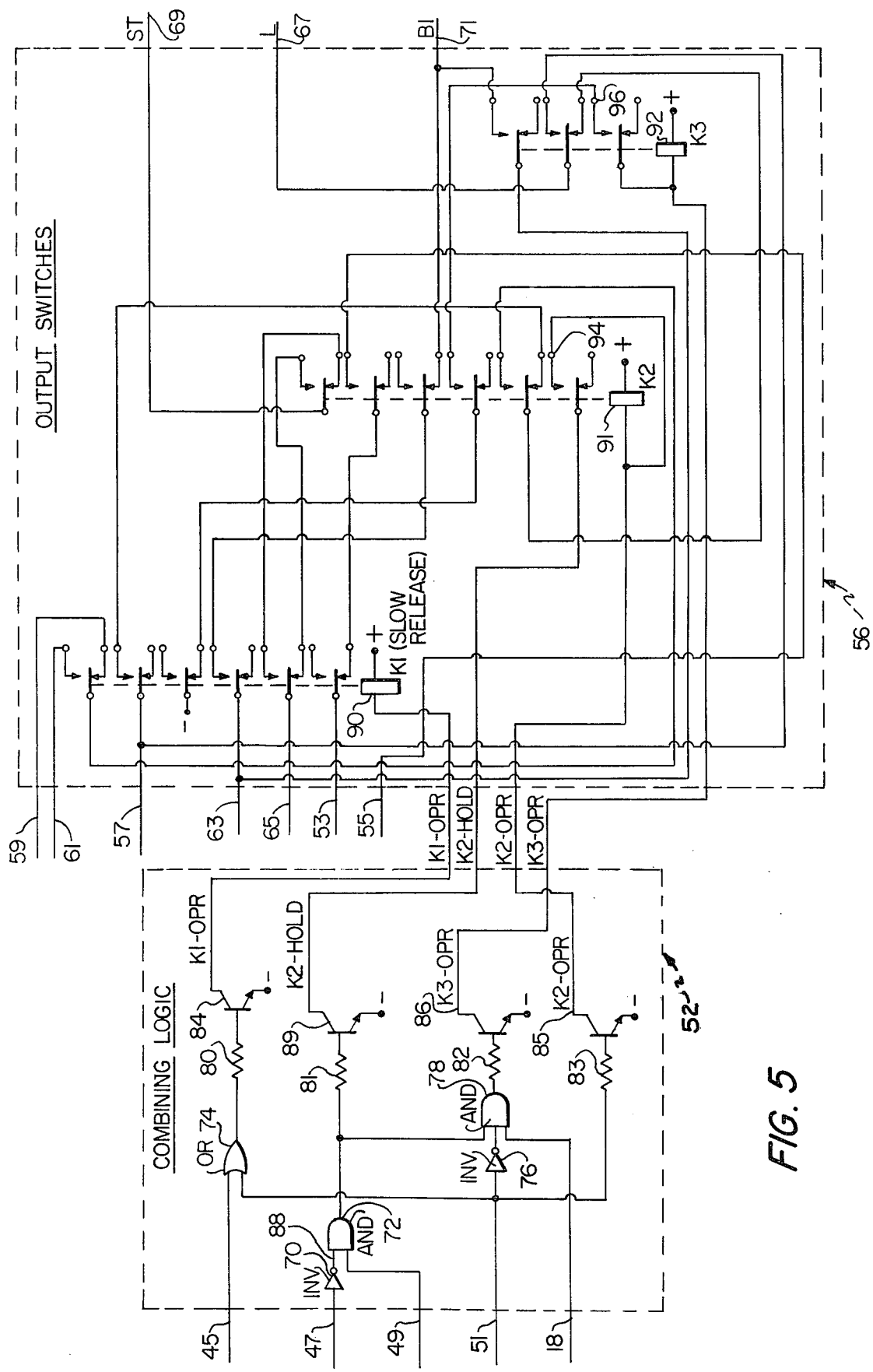
FIG. 5 is an electronic diagram of that portion of the FIG. 4 "line card" block diagram which translates the various signal inputs into the appropriate telephone signal outputs thereby performing the normal annunciator functions in addition to the specialized annunciator functions in accordance with the teachings of the instant invention.

Attention now is directed to FIG. 5 of the application drawings wherein a more detailed circuit diagram is illustrated depicting one approach to the implementation of the combining logic 52 and the output switches 56 of FIG. 4. Common input and output lines with respect to both figures have been designated by the same reference numeral.

Coupled to inputs 47 and 49 is an AND gate 72, gate 72 being utilized to indicate that the load signal is present concurrent with a lack or absence of the Central Office Disconnect signal. Since the load detector 48 of FIG. 4 would be ON if the voltage is above a certain value (typically 12 volts), and since the Central Office Disconnect detector 50 of FIG. 4 would be OFF if the voltage is below a certain value (typically 3 volts), and further since an inverter 70 reverses the polarity from input 47 to wire 88, both wire or line 88 and wire or input 49 will be ON if the voltage is between 3 and 12 volts. Therefore, if the voltage is between 3 and 12 volts, AND gate 72 will be ON and, through the use of current limiting resistor 81, transistor 89 will be ON.

In a similar manner the following statements are implemented:

a. Key signal ON, or ring voltage ON (or 6 seconds thereafter) will operate relay K1 by turning transistor 84 ON;

b. Voltage between 3 and 12 volts and key signal OFF and voice signal ON will operate relay K3 by turning transistor 86 ON; and signal OFF c. Key signal ON will operate relay K2 by turning transistor 85 ON.

Relays K1 (90), K2 (91) and K3 (92) provide outputs for the states shown in FIG. 3 as follows:

a. Idle —    K1 released
             K2 released
             K3 released
   Bl (bell) 71 — off or open
   L (lamp) 67 — off or open
   ST (interrupter start) 69 — off or open
   Shunt 53, 55 — off or open b. Call in Progress (key signal ON) —    K1 operated
                                         K2 operated
                                         K3 released
   Bl (71) — off or open
   L (67) — connected to ± 10V (steady) input 61
   ST (69) — off or open
   Shunt (53,55) — off or open c. Incoming call (ring voltage ON or 6 seconds thereafter)—    K1 operated
                                                               K2 released
                                                               K3 released
   Bl (71)— connected to RN or ± 105V input 45 causing bell to ring interrupted or continuously, respectively
   L (67) — connected to flashing input 57
   ST (69) — connected to ground 65
   Shunt (53,55) — off or open d. Hold on Hold (key signal was ON and went OFF with the voltage remaining between 3 and 12 volts) -
   K1 — released, slowed up to give K2 a chance to release first if voltage is not between 3 and 12 volts
   K2 — operated via transistor 89 and a "make" contact 94 of K2
   K3 — released
   Bl (71) — off or open
   L (67) — connected to winking input 59
   ST (69) — connect to ground 65
   Shunt (53,55) — connected together e. Ring on Hold (voice signal ON, key signal OFF, voltage between 3 and 12 volts)—    K1 — released
                                                                                      K2 — operated
                                                                                      K3 — operated and holding via its own make contact 96.
   Bl (71) — connected to RN or ± 105V input 45 causing bell to ring
   L (67) — connected to flashing input 57
   ST (69) — connected to ground 65
   Shunt (53,55) — off or open Thus, it can be seen that the logic and output switches of FIG. 5 will implement the required functions called for in the state diagram of FIG. 3.

It should further be appreciated by those skilled in the art that the utilization of the "line card" as above-discussed and particularly the sequencing of functional states as explained, represents but one exemplary approach to the application of the novel invention to multi-line key equipment. Other modifications will be evident, all within the general teachings of the instant invention as was basically described with respect to the generalized embodiment of FIG. 1 of the application drawings.

What is claimed is:

1. An apparatus for annunciating the completion of a call hold interval in a telephone communication system, said apparatus comprising in combination:

hold detector circuit means automatically responsive to the presence of a call hold condition on a telephone communication line for providing a first audio detection signal;

voice frequency detector circuit means responsive to the presence of an audio signal on said telephone communication line for providing a second detection signal; and logic circuit means for generating an annunciation signal only upon the concurrence of both said first and second detection signals;

whereby the return of one party during a call hold condition of the telephone line to thus complete a call hold interval can be signalled to another party to the call.

2. An apparatus as defined in claim 1, wherein said voice detector circuit means monitors the voltage across the "tip" and "ring" terminals of the telephone communication line to determine the presence of an audio signal.

3. An apparatus as defined in claim 1, wherein said annunciation signal comprises an audible signal.

4. An apparatus as defined in claim 1, wherein said annunciation signal comprises a visual signal.

5. An apparatus as defined in claim 1, wherein said audio detector circuit means includes a threshold circuit for limiting the actuation of said detector circuit to voice frequency signals which exceed a predetermined magnitude.

6. In a key telephone line card, which line card is responsive to the state of a telephone call on a telephone line and the actuation of key switches on a multi-line push button telephone coupled to the telephone line to control and energize key switch lamps, to generate ringing signals for the bell of the telephone, and to selectively place such call in a hold condition by means of a hold circuit upon actuation of a hold key on the telephone, the improvement which comprises:

detection circuit means provided on said line card responsive to the concurrence of a voice frequency signal on the telephone line during a hold condition to generate a trigger signal; and wherein said line card includes circuit means further responsive to said trigger signal to energize at least one of said bell and a key switch lamp of said telephone, whereby the termination of a call hold interval is annunciated.

7. The improvement as defined in claim 6, wherein said detection circuit means monitors the voltage across the "tip" and "ring" terminals of the telephone line during said hold condition to detect the occurrence of a voice frequency signal.

8. The improvement as defined in claim 7, wherein said detection circuit further includes a threshold circuit for rejecting voice frequency signals below a predetermined minimum amplitude.

9. The improvement as defined in claim 8, wherein said detection circuit further includes filter means for blocking D.C. signals on said "tip" and "ring" terminals.

10. The improvement as defined in claim 6, wherein said line card circuit means is responsive to said trigger signal to ring the bell on the telephone, and to effect a flashing of a key switch lamp.

11. The improvement in a line card defined in claim 6, wherein said detection circuit means is responsive to a hold condition on the telephone line provided by the actuation of a hold key on the telephone of a distant party connected to said telephone line.

12. The improvement in a line card as defined in claim 6, wherein said detection circuit means is responsive to a hold condition on said telephone line provided by the actuation of a hold key on the telephone connected to said line card.

13. The improvement in a line card as defined in claim 6, wherein said detection circuit means is responsive to a hold condition on said telephone line provided by both the actuation of a hold key on the telephone connected to said line card and the actuation of a hold key on the telephone of a distant party connected to said telephone line.

* * * * *